United States Patent
McConnell et al.

(10) Patent No.: US 6,985,317 B2
(45) Date of Patent: Jan. 10, 2006

(54) METHOD AND APPARATUS FOR TESTING THE RELIABILITY OF A DISK DRIVE

(75) Inventors: William Harlow McConnell, Los Altos Hills, CA (US); Gordon James Smith, Rochester, MN (US); by Molly Smith, legal representative, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 337 days.

(21) Appl. No.: 10/137,826

(22) Filed: May 2, 2002

(65) Prior Publication Data

US 2003/0206357 A1 Nov. 6, 2003

(51) Int. Cl.
*G11B 27/36* (2006.01)
(52) U.S. Cl. .................. 360/31; 360/75; 360/97.02
(58) Field of Classification Search .............. 360/31, 360/75, 25, 97.02, 77.02, 77.03
See application file for complete search history.

(56) References Cited

U.S. PATENT DOCUMENTS

| | | | |
|---|---|---|---|
| 6,097,559 A * | 8/2000 | Ottesen et al. | 360/31 |
| 6,411,458 B1 * | 6/2002 | Billings et al. | 360/75 |
| 6,587,301 B1 * | 7/2003 | Smith | 360/75 |
| 6,700,726 B1 * | 3/2004 | Gillis et al. | 360/31 |

* cited by examiner

*Primary Examiner*—David Hudspeth
*Assistant Examiner*—Natalia Figueroa
(74) *Attorney, Agent, or Firm*—Darren Gold; Douglas R. Millett

(57) ABSTRACT

The present invention provides a method, apparatus and program product for testing the reliability of a disk drive. The head-to-disk clearance of a disk drive is measured at different slider airbearing conditions. The change in head-to-disk clearance between the slider airbearing conditions is calculated. If the calculated head-to-disk clearance change between airbearing conditions for each of the heads in the disk drive exceeds a predetermined threshold, the disk drive is verified as having passed the reliability test. Differences in slider airbearing conditions are generated by varying pressures and/or temperatures under which the drive is operated.

12 Claims, 9 Drawing Sheets

METHOD AND APPARATUS FOR TESTING THE RELIABILITY OF A DISK DRIVE

FIELD OF THE INVENTION

The present invention relates generally to disk drive systems, and more specifically to an apparatus and method for testing the reliability of a disk drive.

BACKGROUND OF THE INVENTION

A typical data storage system includes a magnetic medium for storing data in magnetic form and a transducer used to write and read magnetic data respectively to and from the medium. A typical data storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover about the disk on an air bearing produced by high speed disk rotation. The distance between the head and the disk surface, which is typically less than 1 microinch, is commonly referred to as head-to-disk clearance or spacing.

Within the data storage system manufacturing industry, much attention is presently being focused on reducing head-to-disk clearance as part of the effort to increase the storage capacity of data storage disks. It is generally desirable to reduce the head-to-disk clearance in order to increase the readback signal sensitivity of the transducer to typically weaker magnet transitions associated with the higher recording density written on disks.

In the continuing effort to minimize head-to-disk clearance, manufacturers of disk drive systems recognize the importance of establishing a nominal head flyheight that is sufficient to avoid disk surface defects, such as protruding asperities. As head-to-disk clearances are reduced to achieve additional improvements in disk drive performance, detecting changes in head-to-disk clearance becomes increasingly important. If the clearance becomes too small, then frequent head-disk contact produces head and disk wear which, in turn, generates particles that contaminate the head-disk interface and can lead to a head crash. In addition, lower head-disk clearance results in more thermal asperities for magnetoresistive heads. Thermal asperities can cause data loss by distorting the readback signal to the point that the data is unreadable.

Unexpected changes in head-to-disk clearance of a particular head, which may or may not result in deleterious head-to-disk contact, are generally indicative of a problem with the particular head or head assembly. By way of example, an appreciable decrease in head-to-disk clearance may be indicative of a suspect head.

A number of screening approaches have been developed for use during disk drive manufacturing to identify heads that are flying with insufficient head-to-disk clearance. One approach is to measure the head-to-disk clearance change which occurs during multiple slider airbearing conditions. Methods commonly employed for measuring flying height change as a result of changes in the readback signal include: clearance modulation detector (CMD), clearance change detector (CCD), harmonic ratio flyheight (HRF), and quantitative readback signal (QRS), among others. All of these methods require external instrumentation or physical connection to the output of the arm electronics module to perform the measurement. These methods vary the RPM's of the disks during the testing procedure (i.e., spin-down mode) in order to produce the necessary head-disk clearance measurements during multiple slider airbearing conditions.

A superior method for measuring flyheight change during drive operation, generalized error measurement (GEM), is built directly into the recording channel, and does not require external instrumentation or physical connection to the output of the arm electronics module to perform the measurement. GEM directly measures various magnetic parameters of the head and disk, as well as figures of merit for the channel electronics. The GEM circuit monitors head flyheight on all data surfaces, channel noise, signal coherence, signal amplitude, writing parameters and other operational characteristics. Unlike conventional error monitors, GEM provides for direct detection of specific mechanisms that can precede a disk drive failure. Unfortunately, GEM measurements cannot be made by varying the RPM's of the disks during pre-shipment testing, as utilized by earlier methods. Newer designs of airbearing sliders lift off the disk surface at increasingly lower RPM's, greatly increasing the risk of head damage during spin-down types of testing.

There is a need for a disk drive reliability test which may be employed by a disk drive manufacturer prior to customer shipment of the drive for estimating the long-term reliability of the head-disk interface. This test should not require any external instrumentation or physical connections to the output of the arm electronics module, and should not require the potentially dangerous technique of varying the RPM's of the disks during the testing process to generate multiple slider airbearing conditions.

SUMMARY OF THE INVENTION

The present invention provides an apparatus and method for estimating the reliability of a disk drive by measuring the head-to-disk clearance at two or more slider airbearing conditions, then calculating the head-to-disk clearance change. If the calculated head-to-disk clearance change of all of the heads exceeds a predetermined threshold, the drive passes the reliability test.

In one embodiment, the measurement of the head-to-disk clearance is accomplished by first loading the disk drive into a vacuum chamber, and establishing a first air pressure within the vacuum chamber. Next, the drive is started, and a plurality of test patterns are written to at least one cylinder and sector on the disk. After the test patterns are written, the drive reads back the plurality of test patterns, measuring the head-to-disk clearance during the read operation. These head-to-disk clearance measurements are stored in a first data array.

After the head-to-disk clearance measurements at the first air pressure is complete, the measurement is performed again under a second slider airbearing condition. A second air pressure is established within the vacuum chamber and the drive is started again. A plurality of test patterns are once again written to at least one cylinder and sector on the disk.

After the test patterns are written, the drive reads back the plurality of test patterns, measuring the head-to-disk clearance during the read operation. This second set of head-to-disk clearance measurements are stored in a second data array.

In one embodiment, the head-to-disk clearance measurements are performed by a generalized error measurement (GEM) circuit built directly into the disk drive, and the revolutions per minute (RPM's) of the drive are held constant during the testing procedure. In one embodiment, the head-to-disk clearance changes are adjusted to account for any temperature and/or ambient pressure differences that occur between the first and second slider airbearing conditions.

In an alternative embodiment, rather than adjusting the pressure in a vacuum chamber, a containment chamber can be filled with a first gas to generate the first slider airbearing condition and the chamber can be filled with a second gas to generate the second slider airbearing condition.

In another embodiment of the present invention, the reliability of the disk drive can be tested by first measuring the head-to-disk clearance of the heads of the disk drive at a first air pressure. The pressure is then incrementally reduced by a predetermined amount. Next, the head-to-disk clearance of the heads are measured at the incrementally reduced pressure, and it is determined if all of the heads have achieved an acceptable drop in flyheight. If all of the heads have achieved an acceptable head-to-disk clearance drop, the drive is marked as good and the test is terminated. Otherwise, the steps of incrementally reducing the pressure, measuring the head-to-disk clearance, and determining if the head-to-disk clearance has achieved an acceptable drop are repeated until the lowest safe pressure for drive operation is reached. If not all of the heads achieve an acceptable head-to-disk clearance drop before the lowest safe pressure for drive operation is reached, the drive is marked bad, and the test is terminated.

The present invention also described an apparatus for evaluating the reliability of a disk drive under test (DUT). The apparatus includes a vacuum chamber coupled to a vacuum controller, where the DUT is placed within the vacuum chamber during testing. The apparatus further includes a DUT interface coupled to the DUT. Finally, the apparatus includes a computer having a processor and memory coupled to the vacuum controller and DUT interface for controlling operation of the DUT and vacuum chamber during the testing procedure. The computer further monitors the operational characteristics of the DUT and the vacuum chamber during testing. The computer controls the starting, stopping, writing and track assuming of the DUT during testing via the DUT interface. The computer also initiates in-situ flyheight measurements and collected the measurements via the DUT interface.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
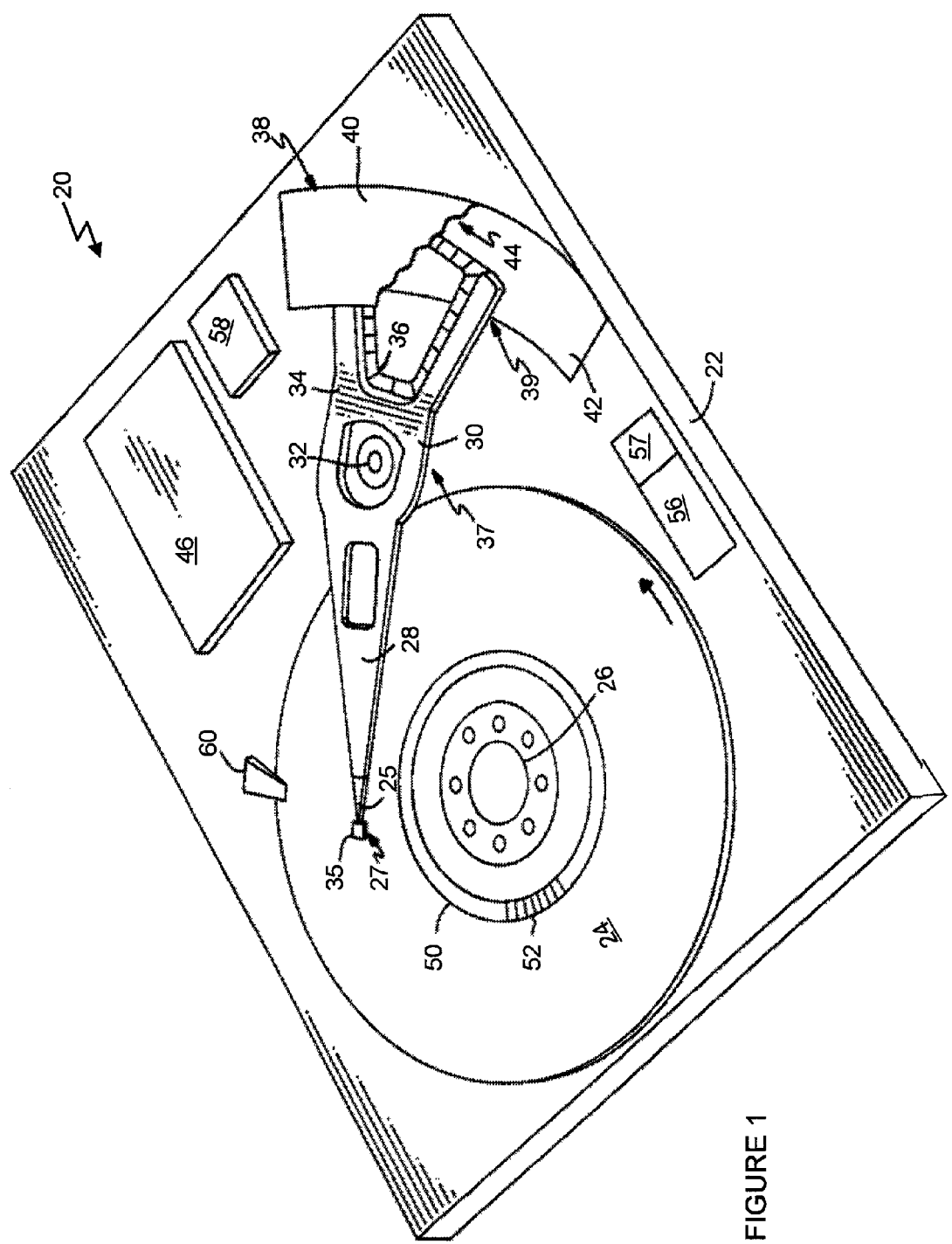
FIG. 1 is a top perspective view of a disk drive system with its upper housing cover removed.
Figure 2:
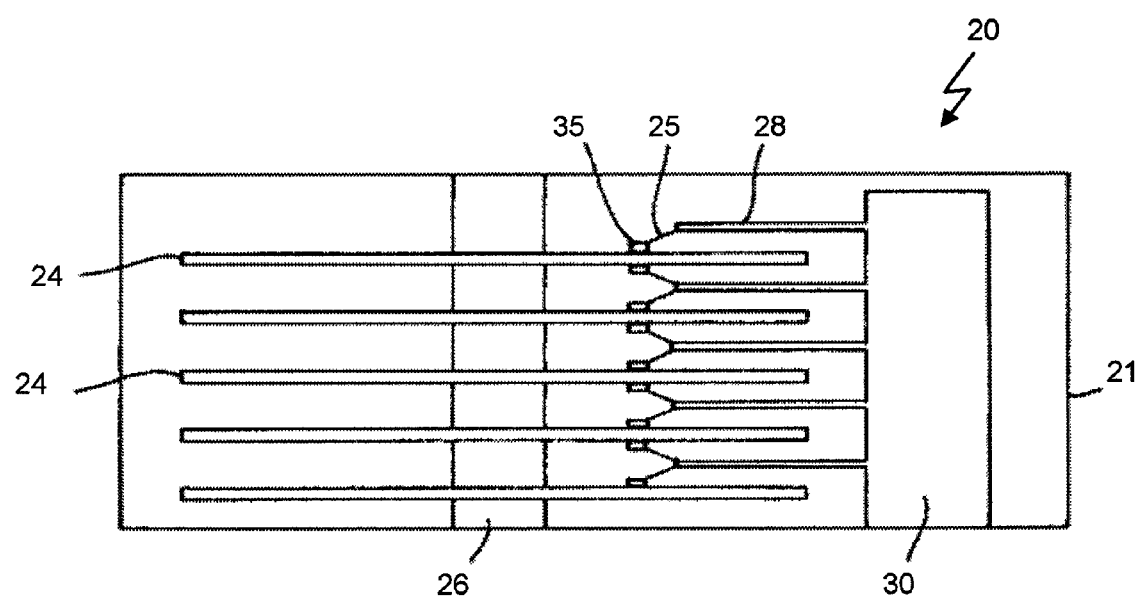
FIG. 2 is a side plan view of a disk drive system comprising a plurality of data storage disks.

Turning to the Drawings, wherein like numbers denote like parts throughout the several views, FIGS. 1 and 2 illustrate a data storage system 20 within which a head-to-disk clearance measurement utilized within the present invention is made. This disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, which each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks. The slider 35 is typically designed as an aerodynamic lifting body that lifts the transducer 27 off the surface as the rate of spindle motor rotation increases and causes the transducer 27 to hover above the disk 24 on an airbearing produced by high speed rotation of the disk. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo At processor 56 controls the direction and magnitude of control current supplied to the voice coil motor 39. The actuator voice coil motor 39 produces a torquing force on the actuator coil frame 34 which controls currents of varying direction and magnitude flowing in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. Although servo processor 56 and disk drive controller 58 are depicted as two separate devices in FIG. 1, it is understood that the functionality of servo processor 56 and disk drive controller 58 may be embodied in a single multi-purpose processor, which typically results in a reduced component cost.

Head-to-disk spacing within disk drive system 20 may be measured in a variety of ways. In a preferred embodiment of the present invention, Generalized error measurement (GEM) electronics are utilized. GEM has many functions. They are all based on measurements of the read signal from a recording head. The GEM flyheight (FH) function can be used, for example, to measure a change in the flying height of a head. GEM FH can only measure a change in head flying height. It cannot measure the absolute flying height. It is not possible to measure the absolute flying height by any method that analyzes the readback signal. This situation is akin to having more unknowns than equations in linear algebra. A unique solution is not possible.

The GEM FH measurement measures the amplitude of certain digitally acquired samples of a read signal. By averaging the amplitude of these samples over many repetitive waveforms on a disk surface, a repeatable number is produced. Prior to the GEM FH measurement, a repetitive GEM FH test pattern is written. Once written, the test pattern is never rewritten. Following this, GEM FH measurements can be made over areas of a disk where the test pattern exists. By keeping track of changes in the GEM FH value for each area of the disk, one can immediately determine how much flying height change occurs by area. This is because the change in GEM FH changes with head flying height in a linear fashion, with the sensitivity dependent only on the wavelength of the repetitive test pattern.

Figure 3A:
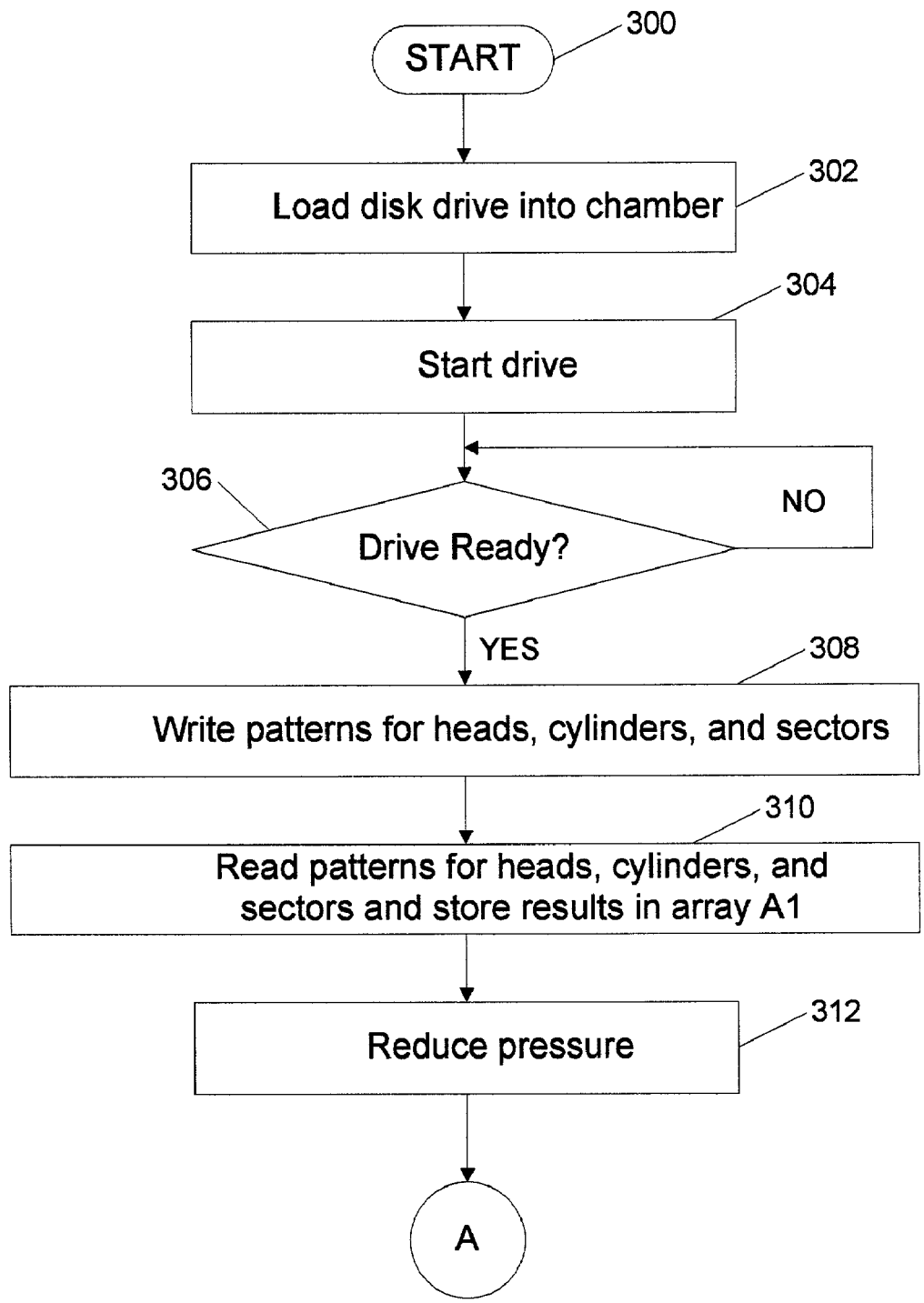
FIG. 3 illustrates a flow diagram of a first method for measuring the amount of head-disk clearance change for a disk drive under varying atmospheric pressures, in accordance with the present invention.
Figure 3B:
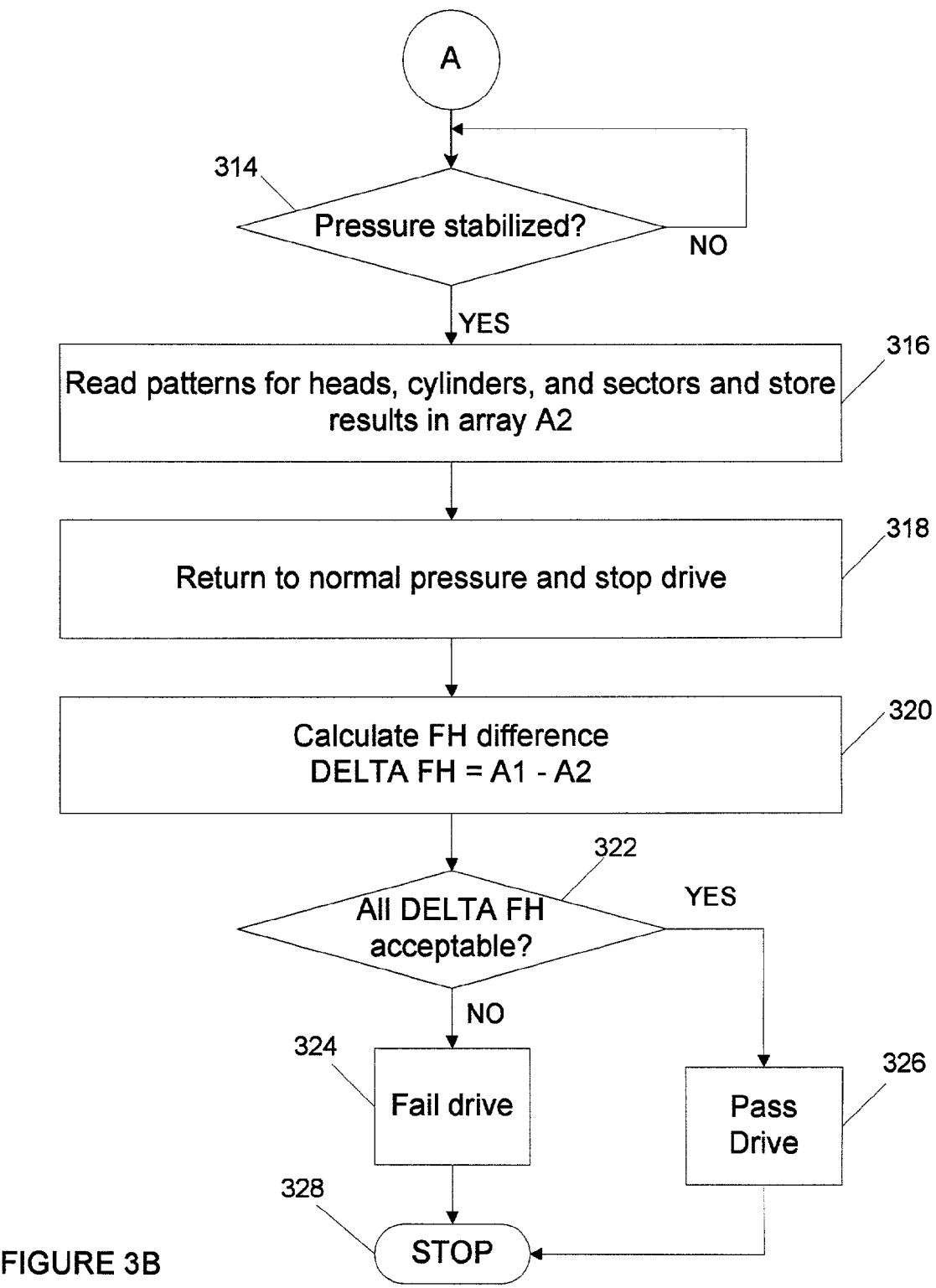

FIG. 3 illustrates a flow diagram of a method for measuring the amount of head-disk clearance change for a disk drive under varying atmospheric pressures. The present invention solves the problem of shipping and/or using disk drives with inadequate head-disk clearance by measuring the clearance changes between two different airbearing conditions. This measurement is performed by reducing the pressure inside of a disk drive or using a gas other than air to cause the head to fly at a reduced clearance. The reduced pressure (or type of gas and pressure) chosen depends on the required clearance for a particular disk drive product which can be determined on the basis of measured or modeled parameters on the heads and disks.

The amount of clearance change caused by the pressure or gas change can be monitored using the readback signal by monitoring its amplitude, for example, and using the well-known Wallace spacing loss relationship to calculate the amount of head-disk spacing change. In this regard, spacing change (measured at the read gap for a head) can be thought of as a clearance change. Heads which do not reduce their clearance to the expected levels when reduced pressure (or a different gas) is introduced, cause the heads and therefore the disk drive to be rejected.

At block 300, the method begins. At block 302, the disk drive is loaded into a vacuum chamber. Next, at block 304, the disk drive is started. After the disk drive is ready for testing (block 306), test patterns are written for one or more heads at one or more cylinders and at one or more sectors, as shown at block 308. GEM flyheight, for example, uses a repeating pattern of four length magnets, typically. After all test patterns have been written, the GEM flyheight for each head, cylinder, and sector is measured and stored in a first data array (A1), as shown at block 310. After storing the data, the pressure in the chamber is reduced to some lower pressure, as shown at block 312. A typical reduced pressure is 0.6 atmospheres, although pressures higher and lower than 0.6 atmospheres may be utilized, and still remain within the scope and spirit of the present invention. The criteria for choosing the lower pressure includes having a large enough pressure difference to produce a measurable clearance change and also making sure that the test does not damage a drive by flying the heads too low. After the drive has stabilized at the lower pressure (as shown at block 314), the GEM flyheight is measured once again for each head, cylinder and sector, and the results are stored in a second array (A2), as shown at block 316. Next, the disk drive is returned to normal pressure, and the drive is stopped, as shown at block 318. Either concurrent with or after the disk drive has been returned to normal pressure, calculations are performed to obtain the difference for the GEM flyheight measurements between the nominal and reduced pressure for the respective heads, cylinders and sectors, as shown at block 320. Once these calculations have been made, it is determined whether the flyheight differences fall within predetermined, normal operating parameters, as shown at block 322. If the drive passes the test (block 326), the drive is marked as good, and the testing procedure terminates at block 328. If the drive fails the test (block 324), the drive is marked as bad, and the testing procedure terminates at block 328.

Some deviations from the flowchart shown in FIG. 3 are possible. First if the normal ambient pressure is subject to variation, the pressure can be controlled at both the nominal and reduced pressure. Otherwise, any variations in normal pressure can be accounted for when comparing the change in the measured flyheight with the expected flyheight through the application of a correction factor to the measurement. The expected flyheight change with pressure can be determined through airbearing modeling, thus providing the correction factor.

A second deviation from the procedure is possible by correcting for any temperature change of the drive during testing. For many airbearing designs, flyheight is a function of temperature. For typical airbearing designs, for example, the flyheight decreases with temperature at a rate of 0.1 to 0.2 nm/degree C., depending on the airbearing, head design, and suspension gimbal mounting method. Thus, if the temperature of the drive is monitored during the procedure, the flyheight change can be corrected for temperature change if desired. Also, the temperature may be monitored and carefully controlled during testing to reduce/eliminate temperature variations. Alternatively, the temperature change can change of pass/fail criteria of the test.

In yet another variation to the testing procedure illustrated in FIG. 3, the test patterns may first be written at the reduced pressure, then the pressure within the vacuum chamber is raised to normal conditions for the second measurement. This method variation may result in less temperature change in the disk drive during testing.

Figure 4:
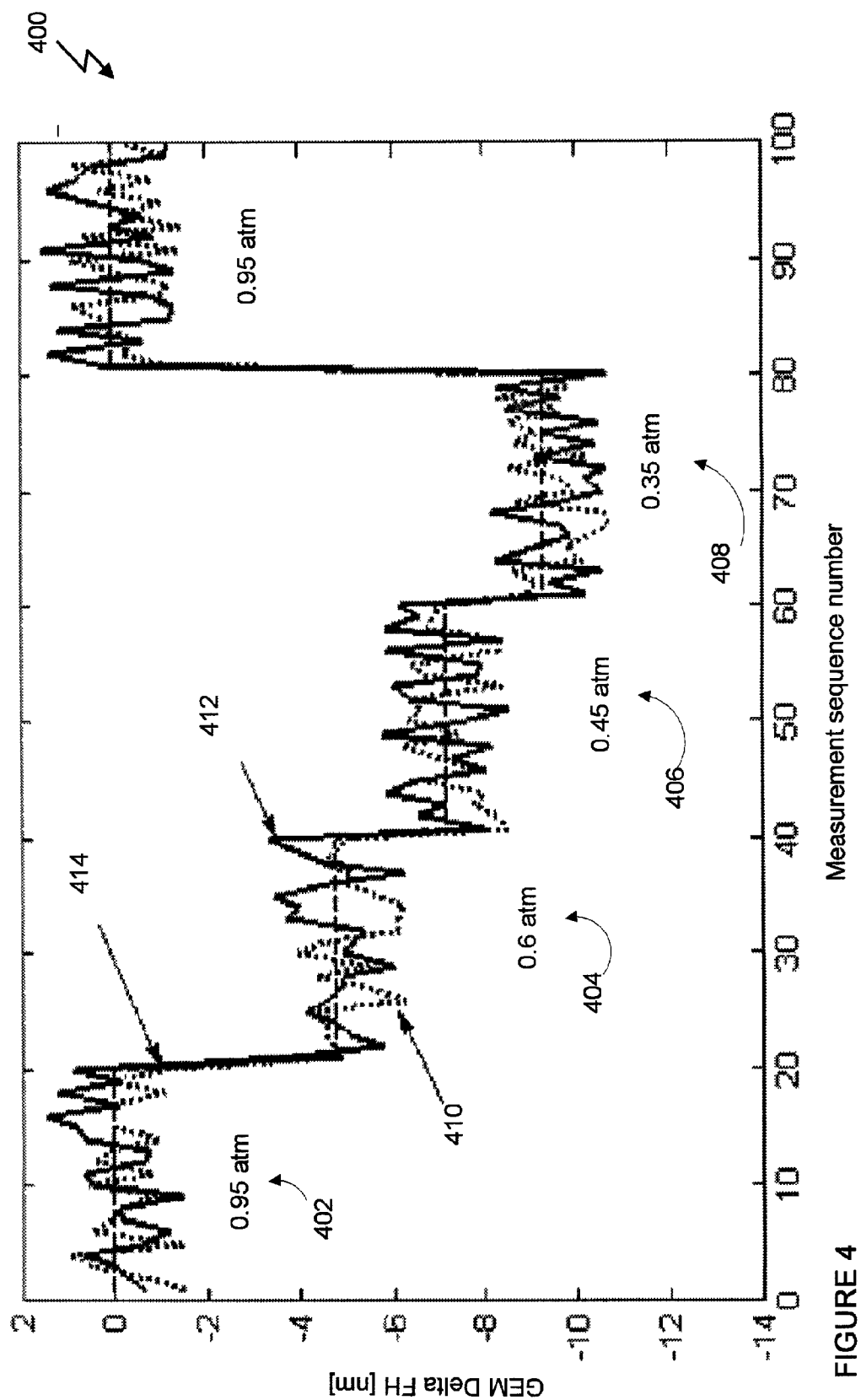
FIG. 4 illustrates actual GEM test results for selected heads of a disk drive at various atmospheric pressures, after performing the method described in FIG. 3.

FIG. 4 illustrates actual GEM test results for selected heads of a typical disk drive at various atmospheric pressures, shown generally at 400. The disk drive was tested at nominal conditions (0.95 atmospheres) 402 and at reduced pressures: 0.6, 0.45 and 0.35 atmospheres (elements 404, 406, and 408, respectively). In general, this graph illustrates the good agreement between the airbearing modeling 414 and GEM FH results. Lines 410 and 412 represent heads 2 and 5 of the disk drive, respectively. The horizontal axis represents the measurement sequence number which can be interpreted as follows. There are 20 data sectors measured for each head at each pressure. Measurement sequence numbers 1–20 are the 20 sectors measured at 0.95 atm, sequence numbers 21–40 are the same 20 sectors measured at 0.6 atm, etc. In the illustrated example, head 5 (element 412) is suspect because of the apparent small flyheight difference in measurements at 0.95 and 0.6 atm. In contrast, head 2 (element 410) has a relatively large flyheight difference in measurements at 0.95 and 0.6 atm.

Figure 5:
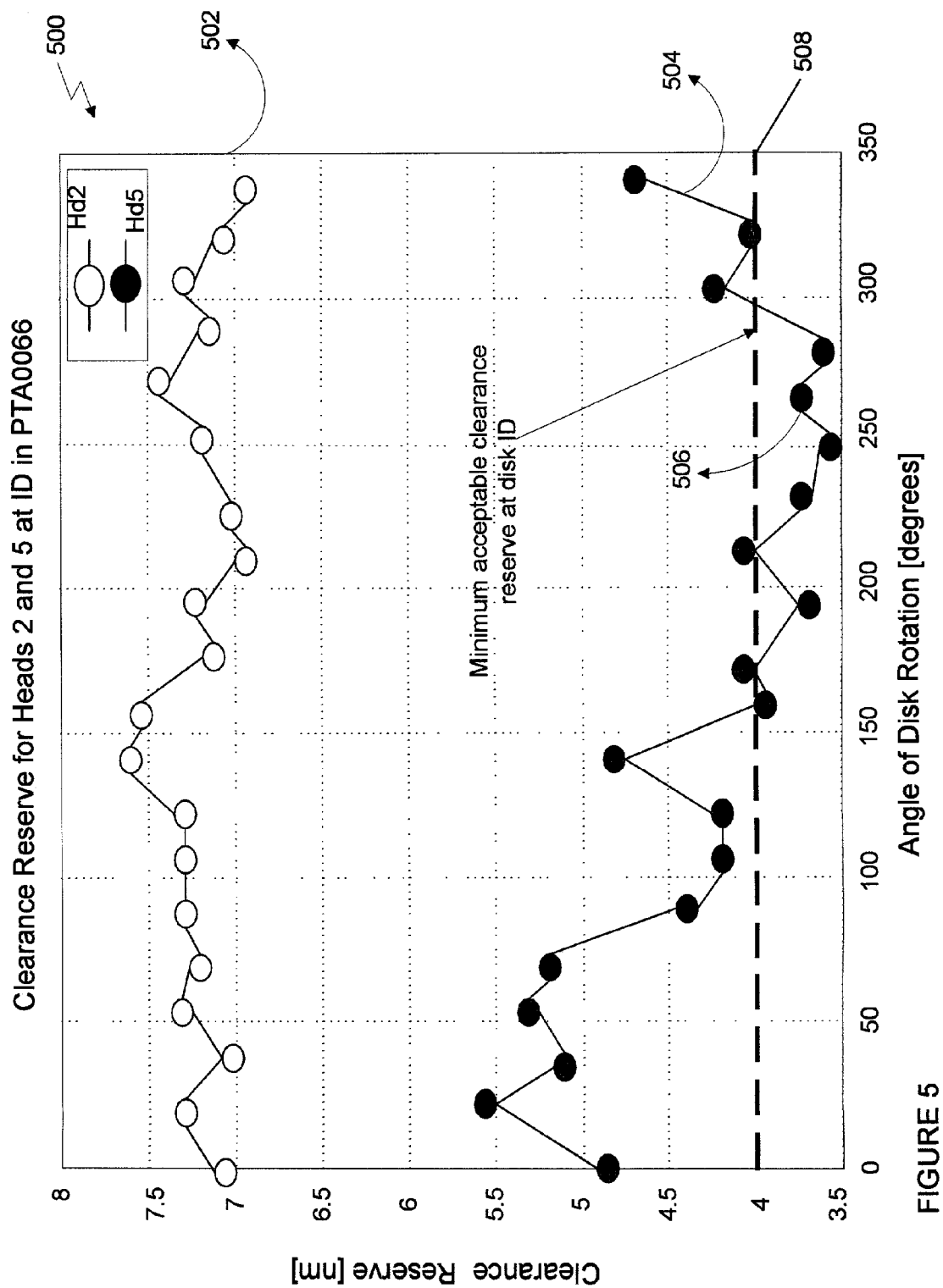
FIG. 5 illustrates the clearance reserves for selected heads based on testing a disk drive at various atmospheric pressures, in accordance with the present invention.

FIG. 5 illustrates clearance reserves for selected heads based on testing a disk drive at various atmospheric pressures, shown generally at 500. Clearance reserve is defined as the difference in head flying height at two pressures. The clearance reserve is calculated on a sector-by-sector basis. That is, the clearance reserve is a vector or length 20 for the drive tested since 20 sectors were tested (each sector being 18 degrees from the next). The clearance reserve for each of the 20 sectors for heads 2 and 5 is shown at 502 and 504, respectively.

In the illustrated example, head 2 has a larger clearance reserve that does head 5. Note that the clearance reserve is defined using pressures 0.95 and 0.6 atm, for which the airbearing model predicts we should see an average change in flying height of approximately 4.8 nm at the disk radius tested. The expected standard deviation in flying height at the inner diameter based on airbearing modeling is approximately 0.4 nm. Thus, it is reasonable to set a minimum acceptable clearance reserve, in this example, of 2 deviations below the average change in flying height (approximately 4.0 nm), as shown at 508. As shown at 506, head 5 shows less than 4 nm clearance reserve between about 200 and 300 degrees of disk rotation. This local reduction in clearance is most likely due to disk curvature, although other causes are possible. Since head 5 has less than the required minimum clearance reserve of 4.0 nm, this drive would fail the reliability test. In contrast to head 5, head 2 easily clears the minimum clearance reserve of 4.0 nm at all angles of disk rotation.

Figure 6:
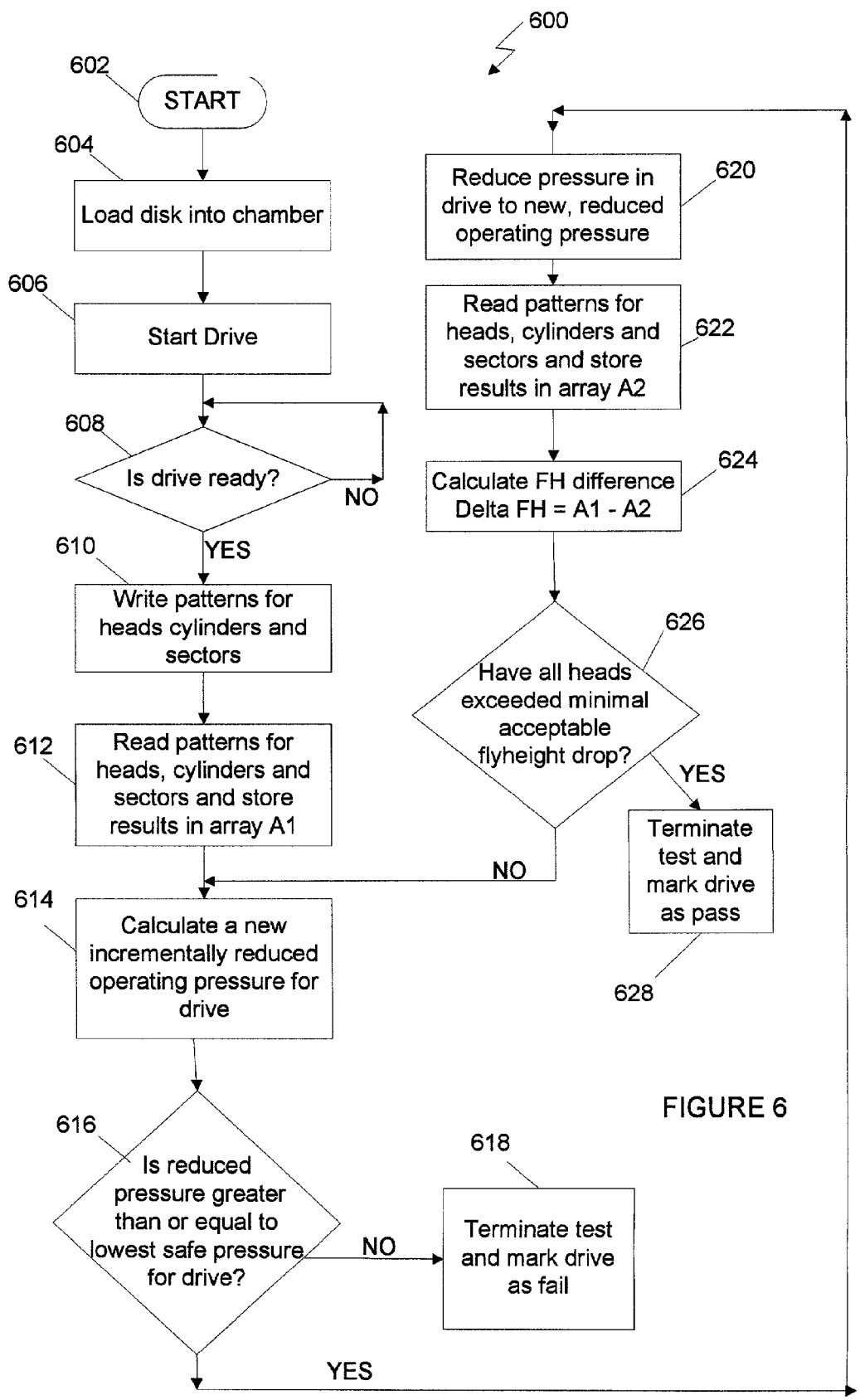
FIG. 6 illustrates a flow diagram of a second method for measuring the amount of head-disk clearance change for a disk drive under varying atmospheric pressures, in accordance with the present invention.

FIG. 6 illustrates a flow diagram of a second method for measuring the amount of head-disk clearance change for a disk drive under varying atmospheric pressures, shown generally at 600. In this embodiment, GEM data measurements are continuously taken for all heads as the ambient pressure is slowly reduced. As soon as it has been determined that all heads have achieved an acceptable drop in flying height, the pressure is restored to nominal and the drive is judged ok. If, on the other hand, one or more heads in a drive do not change flyheight sufficiently before the lowest safe operational pressure is reached, the drive is failed.

The specific steps for this embodiment are described as follows: The method begins at block 602. At block 604 the disk drive is loaded into a vacuum chamber and a nominal starting pressure is established. Next, at block 606, the drive is started. At block 608, it is determined if the drive is ready to perform the test. After the drive is ready for the test, test patterns are written to various heads, cylinders and sectors of the disk, shown at block 610. Next, these patterns are read back from the various heads, cylinders and sectors, as shown at block 612, and flyheight measurement results for the nominal pressure are written to a data array (A1).

At block 614, an incrementally reduced pressure for the next test is calculated. As an example, the first incrementally reduced pressure might be the nominal pressure minus some small fixed value such as 0.1 atm. Thus, assuming a nominal pressure of 0.95 atm, the incrementally reduced pressure for the next test would be 0.85 atm. It is contemplated that the fixed value used for incrementally reducing the nominal pressure may be greater or smaller than 0.10 atm, depending upon such factors such as test time and the number of measurements required to adequately determine flyheight changes.

At block 616, it is determined whether the incrementally reduced pressure calculated at block 614 is greater than or equal to the lowest acceptable operating pressure for the drive. This comparison is performed to ensure that the testing procedure does not degrade good drives. If the calculated reduced pressure is below the lowest acceptable operating pressure, the test is terminated, pressure is normalized and the drive is marked as having failed the test, as shown at block 618. Otherwise, the current pressure in the drive is reduced to the incrementally reduced pressure, as shown at block 620.

At block 622, the test patterns are read again for the selected heads, cylinders and sectors at the incrementally reduced pressure, and stored in array (A2). Next, the flyheight differences are calculated for all of the heads of the drive, by subtracting the A2 array values from the A1 array values, as shown at block 624. Next, at block 626, it is determined if all of the heads have exceeded a minimum acceptable flyheight drop at the incrementally reduced pressure. If so, the test is terminated, pressure is normalized and the drive is marked as having passed the test, as shown at block 628. Otherwise, the method returns to block 614, where a new, incrementally reduced operating pressure for the drive is computed.

Figure 7:
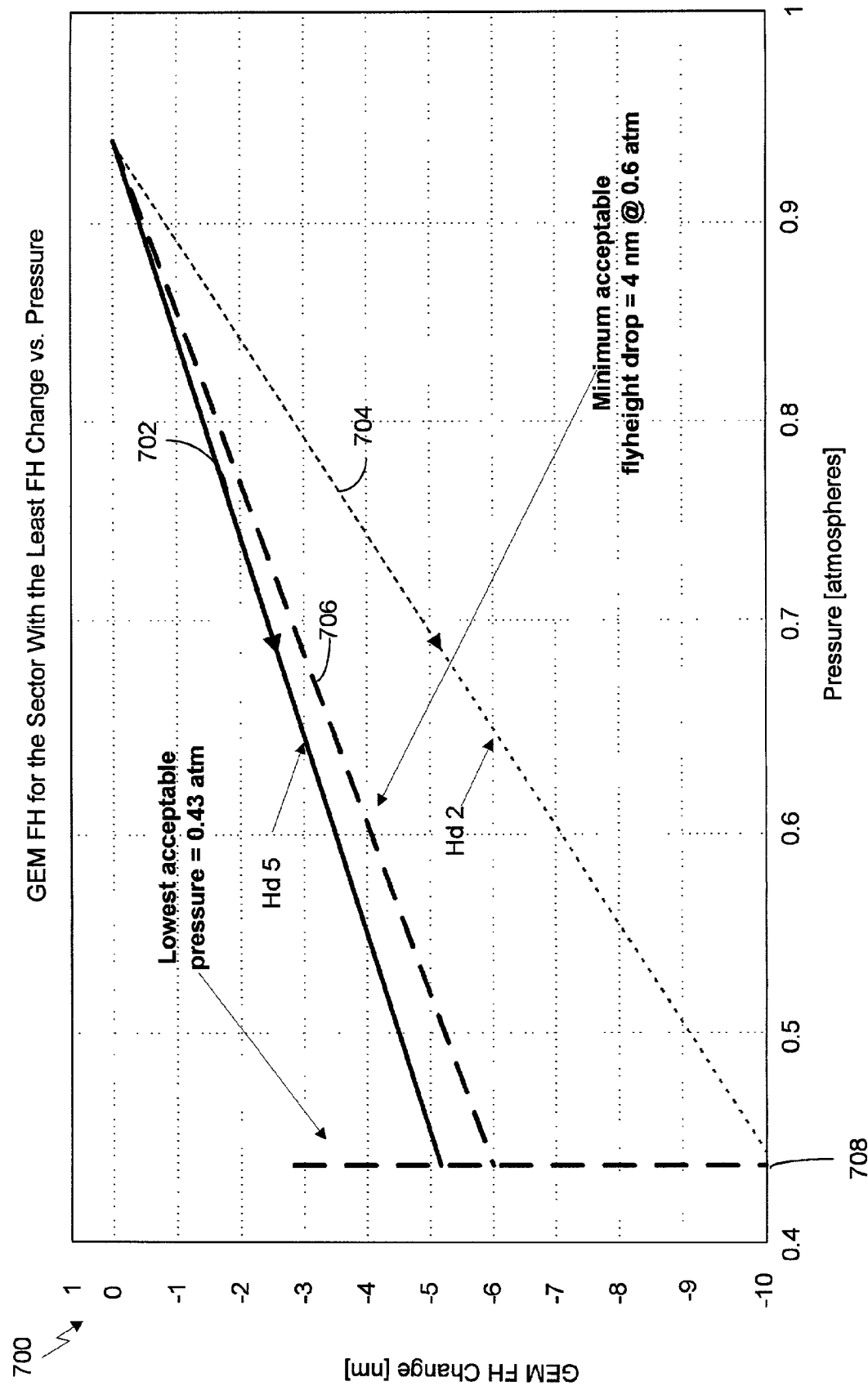
FIG. 7 schematically illustrates test results for selected heads of a disk drive at various atmospheric pressures, after performing the method described in FIG. 6.

FIG. 7 schematically illustrates test results for selected heads of a disk drive at various atmospheric pressures, after performing the method described in FIG. 6. Graph 700 represents GEM flyheight change in nm along the vertical axis, while the pressure in atmospheres is shown along the horizontal axis. In the illustrated example, heads 2 and 5 for a disk drive are shown. The GEM FH data for head 5 is shown as a solid line 702 and head 2 is shown as a dotted line 704. A dashed line 706 which descends from right to left shows the minimum amount that a head must drop in flying height to be judged acceptable. As previously stated, there is a lowest pressure below which the pressure may not drop (i.e., so that the test does not degrade good drives). This lowest acceptable pressure is shown by the vertical dashed line 708 at 0.43 atmospheres. In order for a drive to pass the test, all heads must fall below dashed line 706 before the lowest acceptable pressure 708 is reached. In this example, all heads must drop by at least 4 nm at 0.6 atmospheres. Head 2 (shown as 704) meets this criterion, while head 5 (shown as 706) does not. Thus, in this instance, the drive fails the test.

Figure 8:
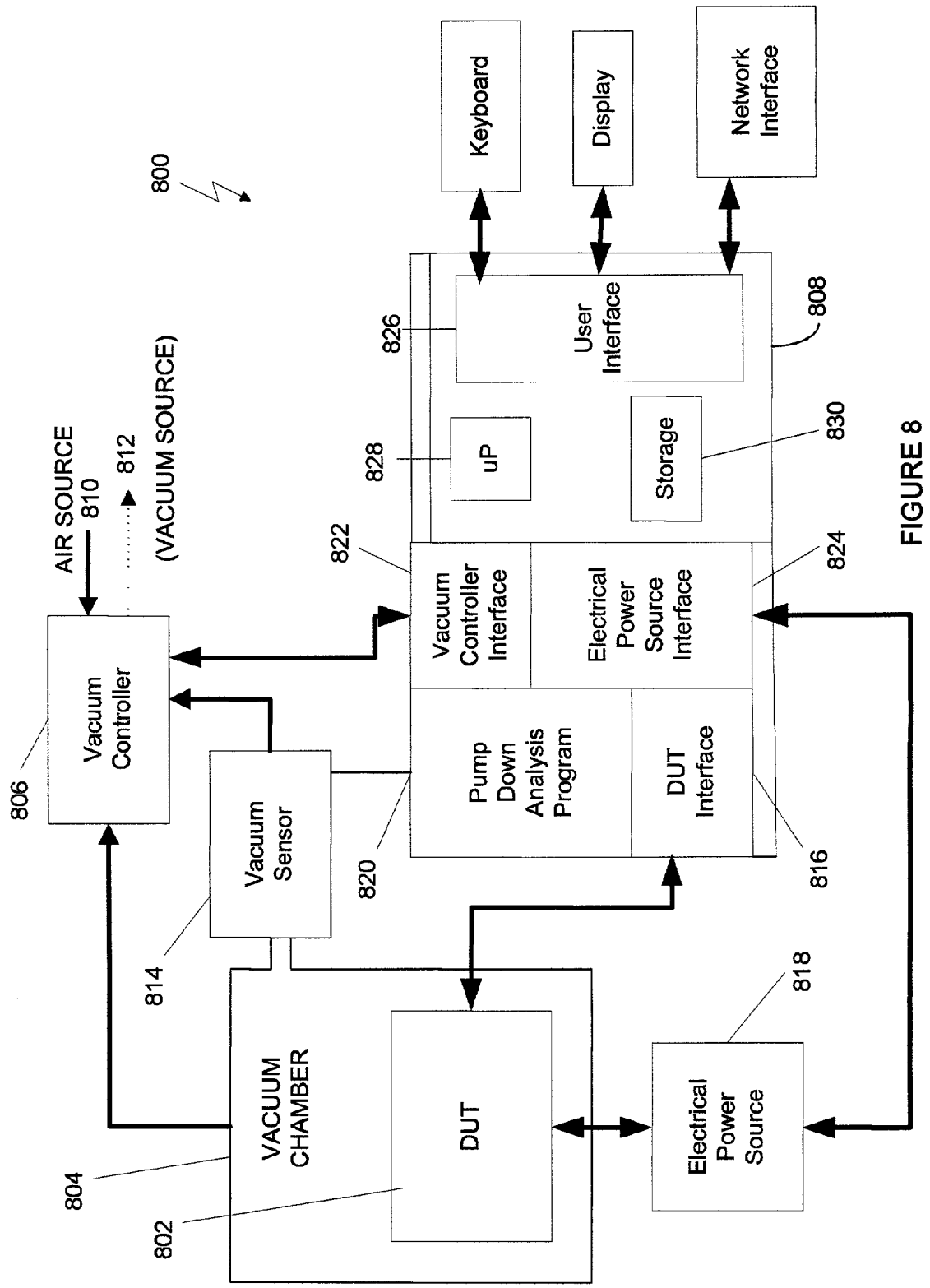
FIG. 8 illustrates a block diagram of an apparatus for performing an in-situ flyheight pump down test in accordance with the present invention.

FIG. 8 illustrates a block diagram of an apparatus for performing an in-situ flyheight pump down test, shown generally at 800. The disk drive under test (DUT) 802 is placed inside of a vacuum chamber 804. Alternatively, DUT 802 may be designed so that it can withstand a pressure differential of between 0.4 and 0.6 atmospheres pressure between its interior and exterior. In this case, vacuum chamber 804 is not necessary as the interior of DUT 804 acts as a vacuum chamber. The usual case, however, is that DUT 804 is not designed for a large pressure differential and vacuum chamber 802 is necessary.

The vacuum (i.e., sub-ambient pressure) inside of vacuum chamber 804 is controlled by using a vacuum controller 806 which accepts commands from a computer 808 that determines the exact pressure inside of vacuum chamber 804. Vacuum controller 806 may use a high-pressure air source 810 to create a vacuum or it may be connected to a vacuum source 812 such as a vacuum pump. A vacuum sensor 814 measures the pressure inside of vacuum chamber 804. Vacuum sensor 814 can be connected to computer 808 or to vacuum controller 806. In either case, computer 808 receives a measurement of the pressure inside of vacuum chamber 804 directly from vacuum sensor 814, or alternatively from vacuum controller 806, via a vacuum controller interface 822. Computer 808 therefore controls the vacuum level in vacuum chamber 804 and is able to receive a measurement of the exact vacuum level in the vacuum chamber.

DUT 802 is attached to computer 808 by way of a standard DUT interface 816. Examples of DUT interface 816 include but are not limited to: small system computer interface (SCSI) and advanced technology adapter (ATA). Through the use of DUT interface 816, computer 808 can control DUT 802. DUT 802 is also connected to a power source 818 which may also be controlled by computer 808. Using DUT interface 816, computer 808 controls the starting and stopping, the writing and reading, and the track accessing for DUT 802. Computer 808 also initiates the in-situ flyheight measurements and collects these measurements via DUT interface 816. Computer 808 has a stored program called a pump down analysis program 820 which controls vacuum controller interface 822, the electrical power source interface 824, the DUT interface 816, and user interfaces 826. In addition, computer 808 contains a microprocessor 828 and storage 830.

Computer 808 operates under the control of an embedded operating system, and executes or otherwise relies upon various software or firmware applications, components, programs, objects, modules, data structures, etc. In general, the routines executed to implement the embodiments of the invention, whether implemented as part of an operating system or a specific application, component, program, object, module or sequence of instructions (e.g., the pump down analysis program 820), will be referred to herein as "computer programs", or simply "programs". The computer programs typically comprise one or more instructions that are resident at various times in various memory and storage devices 830 in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and other programmable electronic devices, those skilled in the art will appreciate that the various embodiments of the invention are capable of being distributed as a program product in a variety of forms, and that the invention applies equally regardless of the particular type of data/signal bearing media used to actually carry out the distribution. Examples of data/signal bearing media include but are not limited to recordable type media such as volatile and nonvolatile memory devices, floppy and other removable disks, hard disk drives, magnetic tape, optical disks (e.g., CD-ROM's, DVD's, etc.), among others, and transmission type media such as digital and analog communication links.

In addition, various programs described herein may be identified based upon the application for which they are implemented in a specific embodiment of the invention. However, it should be appreciated that any particular program nomenclature used herein is used merely for convenience, and thus the invention should not be limited to use solely in any specific application identified and/or implied by such nomenclature.

Additional modifications may be made to the illustrated embodiments without departing from the spirit or scope of the invention. Therefore, the invention lies in the claims hereinafter appended.

What is claimed is:

1. A method for estimating the reliability of a disk drive, comprising the steps of:
    measuring the head-to-disk clearance of at least one head at a first slider airbearing condition, comprising the steps of:
        loading the disk drive into a vacuum chamber;

establishing a first air pressure within the vacuum chamber;

starting the disk drive;

writing a plurality of test patterns from the at least one head to at least one cylinder and at least one sector on the disk;

reading the plurality of test patterns from the at least one cylinder and at least one sector of the disk by the at least one head, wherein the head-to-disk clearance is measured during the read operation; and storing the head-to-disk clearance measurements in a first data array;

measuring the head-to-disk clearance of the at least one head at a second slider airbearing condition;

calculating a head-to-disk clearance change that occurs between the first slider airbearing condition and the second slider airbearing condition for each of the at least one heads; and determining if the head-to-disk clearance change for each of the at least one head exceeds a predetermined threshold for successful drive operation.

2. The method of claim 1, wherein the step of measuring the head-to-disk clearance of at least one head at a second slider airbearing condition further comprises the steps of:

establishing a second air pressure within the vacuum chamber;

starting the disk drive;

writing a plurality of test patterns from the at least one head to at least one cylinder and at least one sector on the disk;

reading the plurality of test patterns from the at least one cylinder and at least one sector of the disk by the at least one head, wherein the head-to-disk clearance is measured during the read operation; and storing the head-to-disk clearance measurements in a second data array.

3. The method of claim 2, wherein the first air pressure is a nominal air pressure, and the second air pressure is a lower than nominal air pressure.

4. The method of claim 2, wherein the first air pressure is a lower than nominal air pressure, and the second air pressure is a nominal air pressure.

5. The method of claim 2, wherein the head-to-disk clearance is measured by a generalized error measurement (GEM) circuit built directly into disk drive.

6. The method of claim 2, wherein the revolutions per minute (RPM's) of the drive are held constant during the disk testing procedure.

7. The method of claim 2, wherein the step of calculating a head-to-disk clearance change between the first slider airbearing condition and the second slider airbearing condition for each of the at least one heads further includes the step of:

adjusting the head-to-disk clearance change to account for any temperature changes that occur between the first slider airbearing condition and the second slider airbearing condition.

8. The method of claim 2, wherein the step of calculating a head-to-disk clearance change between the first slider airbearing condition and the second slider airbearing condition for each of the at least one heads further includes the step of:

adjusting the head-to-disk clearance change to account for any ambient pressure differences that occur between the first slider airbearing condition and the second slider airbearing condition.

9. The method of claim 2, wherein temperature is monitored and controlled during testing to reduce or eliminate temperature variations that occur between the first slider airbearing condition and the second slider airbearing condition.

10. A method for estimating the reliability of a disk drive, comprising the steps of:

measuring the head-to-disk clearance of at least one head at a first slider airbearing condition, comprising the steps of:

loading the disk drive into a containment chamber;

filling the containment chamber with a first gas;

starting the disk drive;

writing a plurality of test patterns from the at least one head to at least one cylinder and at least one sector on the disk;

reading the plurality of test patterns from the at least one cylinder and at least one sector of the disk by the at least one head, wherein the head-to-disk clearance is measured during the read operation; and storing the head-to-disk clearance measurements in a first data array;

measuring the head-to-disk clearance of the at least one head at a second slider airbearing condition;

calculating a head-to-disk clearance change that occurs between the first slider airbearing condition and the second slider airbearing condition for each of the at least one heads; and determining if the head-to-disk clearance change for each of the at least one head exceeds a predetermined threshold for successful drive operation.

11. A method for estimating the reliability of a disk drive, comprising the steps of:

measuring the head-to-disk clearance of at least one head at a first slider airbearing condition, measuring the head-to-disk clearance of the at least one head at a second slider airbearing condition comprising the steps of:

loading the disk drive into a containment chamber;

filling the containment chamber with a second gas;

starting the disk drive;

writing a plurality of test patterns from the at least one head to at least one cylinder and at least one sector on the disk;

reading the plurality of test patterns from the at least one cylinder and at least one sector of the disk by the at least one head, wherein the head-to-disk clearance is measured during the read operation; and storing the head-to-disk clearance measurements in a second data array;

calculating a head-to-disk clearance change that occurs between the first slider airbearing condition and the second slider airbearing condition for each of the at least one heads; and determining if the head-to-disk clearance change for each of the at least one head exceeds a predetermined threshold for successful drive operation.

12. A program product embodied upon a computer-readable medium comprising:

a program configured to measure, in at least one of a vacuum chamber and a contaminant chamber, a head-to-disk clearance of at least one head of a disk drive at a first slider airbearing condition; start the disk drive; write a plurality of test patterns from the at least one head to at least one cylinder and at least one sector on the disk; read the plurality of test patterns from the at least one cylinder and at least one sector of the disk by the at least one head; store the head-to-disk clearance measurements in a first data array; measure the head-to-disk clearance of the at least one head at a second slider airbearing condition; calculate a head-to-disk clearance change between the first slider airbearing condition and the second slider airbearing condition for each of the at least one heads; and determine if the head-to-disk clearance change for each of the at least one head exceeds a predetermined threshold for successful drive operation.

* * * * *